(12) United States Patent
Guillot et al.

(10) Patent No.: US 11,353,721 B2
(45) Date of Patent: *Jun. 7, 2022

(54) LENS ELEMENT

(71) Applicant: Essilor International, Charenton-le-Pont (FR)

(72) Inventors: Matthieu Guillot, Charenton-le-Pont (FR); Björn Drobe, Singapore (SG)

(73) Assignee: Essilor International, Charenton-le-Pont (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/353,468

(22) Filed: Jun. 21, 2021

(65) Prior Publication Data

US 2021/0311330 A1 Oct. 7, 2021

Related U.S. Application Data

(63) Continuation of application No. 17/200,950, filed on Mar. 15, 2021, now Pat. No. 11,073,704, which is a
(Continued)

(30) Foreign Application Priority Data

Mar. 1, 2018 (EP) ..................................... 18305216
Mar. 1, 2018 (EP) ..................................... 18305217
(Continued)

(51) Int. Cl.
*G02C 7/02* (2006.01)
*G02B 3/04* (2006.01)
(Continued)

(52) U.S. Cl.
CPC .............. *G02C 7/022* (2013.01); *G02B 3/04* (2013.01); *G02C 7/06* (2013.01); *G02C 7/061* (2013.01);
(Continued)

(58) Field of Classification Search
CPC .......... G02C 7/022; G02C 7/06; G02C 7/061; G02C 7/066; G02C 7/086; G02C 7/02;
(Continued)

(56) References Cited

U.S. PATENT DOCUMENTS

| 1,955,047 A | 4/1934 | Beach |
| 3,902,693 A | 9/1975 | Crandon et al. |
| (Continued) | | |

FOREIGN PATENT DOCUMENTS

| CA | 2 263 635 C | 9/1999 |
| CN | 101688983 A | 3/2010 |
| (Continued) | | |

OTHER PUBLICATIONS

International Search Report and Written Opinion of the International Searching Authority dated May 27, 2019, in PCT/EP2019/055216. filed Mar. 1, 2019.
(Continued)

*Primary Examiner* — William R Alexander
(74) *Attorney, Agent, or Firm* — Oblon, McClelland, Maier & Neustadt, L.L.P.

(57) ABSTRACT

A lens element worn in front of an eye of a person includes a refraction area having a first refractive power based on a prescription for correcting an abnormal refraction of the eye of the person and a second refractive power different from the first refractive power and a plurality of at least three optical elements, at least one optical element having an optical function of not focusing an image on the retina of the eye so as to slow down the progression of the abnormal refraction of the eye.

17 Claims, 6 Drawing Sheets

Related U.S. Application Data continuation of application No. 17/134,606, filed on Dec. 28, 2020, now Pat. No. 10,948,744, which is a continuation of application No. 16/976,662, filed as application No. PCT/EP2019/055216 on Mar. 1, 2019.

(30) Foreign Application Priority Data

| Mar. 30, 2018 | (EP) | ................................... | 18305384 |
| Mar. 30, 2018 | (EP) | ................................... | 18305385 |
| Apr. 11, 2018 | (EP) | ................................... | 18305435 |
| Apr. 11, 2018 | (EP) | ................................... | 18305436 |
| Apr. 26, 2018 | (EP) | ................................... | 18305526 |
| Apr. 26, 2018 | (EP) | ................................... | 18305527 |

(51) Int. Cl.
G02C 7/06 (2006.01)
G02C 7/08 (2006.01)

(52) U.S. Cl.
CPC ............. *G02C 7/066* (2013.01); *G02C 7/086* (2013.01); *G02C 2202/20* (2013.01); *G02C 2202/24* (2013.01)

(58) Field of Classification Search
CPC ... G02C 2202/20; G02C 2202/24; G02B 3/02
USPC .................................................... 351/159.42
See application file for complete search history.

(56) References Cited

U.S. PATENT DOCUMENTS

| 4,704,016 | A | 11/1987 | de Carle |
| 5,142,411 | A | 8/1992 | Fiala |
| 5,359,440 | A | 10/1994 | Hamada et al. |
| 5,507,806 | A | 4/1996 | Blake |
| 5,517,260 | A | 5/1996 | Glady et al. |
| 5,753,092 | A | 5/1998 | Hollars et al. |
| 5,798,027 | A | 8/1998 | Lefebvre et al. |
| 5,982,543 | A | 11/1999 | Fiala |
| 6,045,578 | A | 4/2000 | Collins et al. |
| 6,129,042 | A | 10/2000 | Smith et al. |
| 6,258,218 | B1 | 7/2001 | Burton |
| 6,343,861 | B1 | 2/2002 | Kris et al. |
| 7,025,460 | B2 | 4/2006 | Smitth et al. |
| 7,679,828 | B2 | 3/2010 | Munro |
| 7,976,158 | B2 | 7/2011 | Drobe |
| 8,113,655 | B1 | 2/2012 | Tyrin et al. |
| 8,950,860 | B2 | 2/2015 | Tse et al. |
| 9,234,988 | B2 | 1/2016 | Akasaka |
| 9,411,172 | B2 | 8/2016 | Haddock |
| 9,442,308 | B2 | 9/2016 | Dai |
| RE47,006 | E | 8/2018 | To et al. |
| 10,268,050 | B2 | 4/2019 | To et al. |
| 10,386,654 | B2 | 8/2019 | Marshall et al. |
| 10,429,670 | B2 * | 10/2019 | Newman ................ G02C 7/022 |
| 10,901,237 | B2 * | 1/2021 | Brennan ................ A61F 2/1613 |
| 10,921,612 | B2 * | 2/2021 | Zhou ...................... G02C 7/022 |
| 11,029,540 | B2 * | 6/2021 | To ............................. G02C 7/06 |
| 11,079,612 | B2 * | 8/2021 | Guillot ................... G02C 7/022 |
| 2002/0023837 | A1 | 2/2002 | Stimson |
| 2002/0145797 | A1 | 10/2002 | Sales |
| 2003/0058407 | A1 | 3/2003 | Aller |
| 2003/0081172 | A1 | 5/2003 | Dreher |
| 2003/0210466 | A1 | 11/2003 | Huang |
| 2005/0056125 | A1 | 3/2005 | Trumper |
| 2005/0105047 | A1 | 5/2005 | Smitth, III et al. |
| 2007/0109494 | A1 | 5/2007 | Dreher |
| 2007/0115431 | A1 | 5/2007 | Smith et al. |
| 2007/0159601 | A1 | 7/2007 | Ho et al. |
| 2008/0164147 | A1 | 7/2008 | Dogi et al. |
| 2008/0218687 | A1 | 9/2008 | Phillips |
| 2008/0223715 | A1 | 9/2008 | Gibson et al. |
| 2008/0286458 | A1 | 11/2008 | Kirchoff |
| 2009/0006017 | A1 | 1/2009 | Young et al. |
| 2009/0153795 | A1 | 6/2009 | Blum et al. |
| 2009/0225435 | A1 | 9/2009 | Boettiger et al. |
| 2010/0183900 | A1 | 7/2010 | Wallin et al. |
| 2010/0201941 | A1 | 8/2010 | Gupta et al. |
| 2011/0040377 | A1 | 2/2011 | Battis et al. |
| 2011/0043751 | A1 | 2/2011 | Blum et al. |
| 2011/0234883 | A1 | 9/2011 | Li et al. |
| 2012/0019775 | A1 | 1/2012 | Tyrin et al. |
| 2012/0033120 | A1 | 2/2012 | Nakamura et al. |
| 2012/0194780 | A1 | 8/2012 | Back |
| 2013/0033636 | A1 | 2/2013 | Pitts et al. |
| 2014/0016015 | A1 | 1/2014 | Miao |
| 2014/0116986 | A1 | 5/2014 | Akasaka |
| 2014/0132933 | A1 | 5/2014 | Martinez |
| 2014/0277433 | A1 | 9/2014 | Pugh et al. |
| 2014/0327875 | A1 | 11/2014 | Blum |
| 2015/0085247 | A1 | 3/2015 | Holden |
| 2015/0160477 | A1 | 6/2015 | Dai |
| 2015/0309332 | A1 | 10/2015 | Hillenbrand et al. |
| 2016/0306192 | A1 | 10/2016 | Marshall et al. |
| 2016/0377884 | A1 | 12/2016 | Lau et al. |
| 2017/0131567 | A1 | 5/2017 | To et al. |
| 2017/0146824 | A1 | 5/2017 | Martinez |
| 2017/0184875 | A1 | 6/2017 | Newman |
| 2018/0231702 | A1 * | 8/2018 | Lin ....................... G02B 5/1871 |
| 2018/0275427 | A1 * | 9/2018 | Lau ........................ G02C 7/081 |
| 2019/0137786 | A1 * | 5/2019 | Cheng .................... G02C 7/044 |
| 2019/0212580 | A1 * | 7/2019 | To ........................... G02C 7/022 |
| 2019/0227342 | A1 * | 7/2019 | Brennan ................... G02C 7/02 |
| 2019/0302481 | A1 * | 10/2019 | Zhou ....................... G02C 11/10 |
| 2020/0012123 | A1 * | 1/2020 | Newman ................. G02C 7/022 |

FOREIGN PATENT DOCUMENTS

| CN | 101713871 A | 5/2010 |
| CN | 102692730 A | 9/2012 |
| CN | 104678572 A | 6/2015 |
| CN | 107212949 A | 9/2017 |
| DE | 10 2012 023 478 A1 | 5/2014 |
| EP | 0 367 878 A1 | 5/1990 |
| EP | 0 445 994 A2 | 9/1991 |
| EP | 1 703 313 A1 | 9/2006 |
| EP | 3 112 925 A1 | 1/2017 |
| GB | 2 411 290 A | 8/2005 |
| GB | 2462890 A | 3/2010 |
| JP | 6-51248 A | 2/1994 |
| TW | 201211618 A1 | 3/2012 |
| WO | 2003/054616 A2 | 7/2003 |
| WO | 2004/029324 A1 | 4/2004 |
| WO | 2006/034652 A1 | 4/2006 |
| WO | 2006/087558 A2 | 8/2006 |
| WO | 2007/041796 A1 | 4/2007 |
| WO | 2007/146673 A2 | 12/2007 |
| WO | 2008/104695 A1 | 9/2008 |
| WO | 2009/100257 A2 | 8/2009 |
| WO | 2010/075319 A2 | 7/2010 |
| WO | 2012/138426 A2 | 10/2012 |
| WO | 2012/168709 A2 | 12/2012 |
| WO | 2015/147758 A1 | 10/2015 |

OTHER PUBLICATIONS

Combined Chinese Office Action and Search Report dated Nov. 12, 2020 In Patent application No. 201980005176.7 (with English language translation).

Office Action dated Mar. 26, 2021 in Russian Patent Application No. 2020131393 (with English translation); 9 pgs.

* cited by examiner

LENS ELEMENT

CROSS-REFERENCE TO RELATED APPLICATIONS

This application is a continuation application of U.S. application Ser. No. 17/200,950 filed Mar. 15, 2021, which is a continuation application of U.S. application Ser. No. 17/134,606 filed Dec. 28, 2020, now U.S. Pat. No. 10,948,744 issued Mar. 16, 2021, herein incorporated by reference, which is a continuation of U.S. application Ser. No. 16/976,662, filed Aug. 28, 2020, which is a National Stage Application of International Application No. PCT/EP2019/055216, filed Mar. 1, 2019, which is based upon and claims the benefit of priority from European Patent Application No. 18305527.6, filed on Apr. 26, 2018, European Patent Application No. 18305526.8, filed on Apr. 26, 2018, European Patent Application No. 18305436.0, filed on Apr. 11, 2018, European Patent Application No. 18305435.2, filed on Apr. 11, 2018, European Patent Application No. 18305385.9, filed on Mar. 30, 2018, European Patent Application No. 18305384.2, filed on Mar. 30, 2018, European Patent Application No. 18305217.4, filed on Mar. 1, 2018, and European Patent Application No. 18305216.6, filed on Mar. 1, 2018, the entire contents of which is incorporated herein by reference.

TECHNICAL FIELD

The invention relates to a lens element intended to be worn in front of an eye of a person to suppress progression of abnormal refractions of the eye such as myopia or hyperopia.

BACKGROUND OF THE INVENTION

Myopia of an eye is characterized by the fact that the eye focuses distant objects in front of its retina. Myopia is usually corrected using a concave lens and hyperopia is usually corrected using a convex lens.

It has been observed that some individuals when corrected using conventional single vision optical lenses, in particular children, focus inaccurately when they observe an object which is situated at a short distance away, that is to say, in near vision conditions. Because of this focusing defect on the part of a myopic child which is corrected for his far vision, the image of an object close by is also formed behind his retina, even in the foveal area.

Such focusing defect may have an impact on the progression of myopia of such individuals. One may observe that for most of said individual the myopia defect tends to increase over time.

Therefore, it appears that there is a need for a lens element that would suppress or at least slow down progression of abnormal refractions of the eye such as myopia or hyperopia.

SUMMARY OF THE INVENTION

To this end, the invention proposes a lens element intended to be worn in front of an eye of a person comprising:
- a refraction area having a first refractive power based on a prescription for correcting an abnormal refraction of said eye of the person and a second refractive power different from the first refractive power;
- a plurality of at least three optical elements, at least one optical element having an optical function of not focusing an image on the retina of the eye so as to slow down the progression of the abnormal refraction of the eye.

Advantageously, having a second refractive power different from the first refractive power for correcting the abnormal refraction of the eye of the person in the refraction area allows increasing the defocus of the light rays in front the retina in case of myopia.

In other words, the inventors have observed that having in the refraction area a second refractive power different from the refractive power for correcting the abnormal refraction combined with optical elements having an optical function of not focusing an image on the retina of the eye helps slow down the progression of abnormal refraction of the eye such as myopia or hyperopia.

The solution of the invention also helps improve the aesthetics of the lens and helps compensate accommodative lag.

According to further embodiments which can be considered alone or in combination:
- the difference between the first refractive power and the second refractive power is greater than or equal to 0.5 D; and/or
- the refractive area is formed as the area other than the areas formed as the plurality of optical elements; and/or
- at least one optical element has a non-spherical optical function; and/or
- at least one, for example all, of the optical elements has an optical function of focusing an image on a position other than the retina; and/or
- in the refractive area the refractive power has a continuous variation; and/or
- in the refractive area the refractive power has at least one discontinuity; and/or
- the lens element is divided in five complementary zones, a central zone having a power being equal to the first refractive power and four quadrants at 45°, at least one of the quadrant having a refractive power equal to the second refractive power; and/or
- the central zone comprises a framing reference point that faces the pupil of the person gazing straight ahead in standard wearing conditions and has a diameter greater than 4 mm and smaller than 20 mm; and/or
- at least lower part quadrant has the second refractive power; and/or
- the refraction area has a progressive addition dioptric function; and/or
- at least one of the temporal and nasal quadrant has the second refractive power; and/or
- the four quadrants have a concentric power progression; and/or
- for every circular zone having a radius comprised between 2 and 4 mm comprising a geometrical center located at a distance of the framing reference that faces the pupil of the user gazing straight ahead in standard wearing conditions greater or equal to said radius+5 mm, the ratio between the sum of areas of the parts of optical elements located inside said circular zone and the area of said circular zone is comprised between 20% and 70%; and/or
- the at least three optical elements are non-contiguous; and/or
- at least one of the optical elements is a spherical micro-lens; and/or
- at least one of the optical elements is a multifocal refractive micro-lens; and/or the at least one multifocal refractive micro-lens comprises an aspherical surface, with or without any rotational symmetry; and/or at least one of the optical elements is a toric refractive micro-lens; and/or at least one of the optical elements is a cylindrical micro-lens; and/or the at least one multifocal refractive micro-lens comprises a toric surface; and/or at least one of the optical elements is made of a birefringent material; and/or at least one of the optical elements is a diffractive lens; and/or the at least one diffractive lens comprises a metasurface structure; and/or at least one optical elements has a shape configured so as to create a caustic in front of the retina of the eye of the person; and/or at least one optical element is a multifocal binary component; and/or at least one optical element is a pixelated lens; and/or at least one optical element is a π-Fresnel lens; and/or at least part, for example all, of the optical elements are located on the front surface of the ophthalmic lens; and/or at least part, for example all, of the optical elements are located on the back surface of the ophthalmic lens; and/or at least part, for example all, of the optical elements are located between the front and the back surfaces of the ophthalmic lens; and/or at least part, for example all, optical functions comprise high order optical aberrations; and/or the lens element comprises an ophthalmic lens bearing the refraction area and a clip-on bearing the plurality of at least three optical elements adapted to be removably attached to the ophthalmic lens when the lens element is worn; and/or the optical elements are configured so that along at least one section of the lens the mean sphere of optical elements increases from a point of said section towards the peripheral part of said section; and/or the optical elements are configured so that along at least one section of the lens the mean cylinder of optical elements increases from a point of said section towards the peripheral part of said section; and/or the optical elements are configured so that along the at least one section of the lens the mean sphere and/or the mean cylinder of optical elements increases from the center of said section towards the peripheral part of said section; and/or the refraction area comprises an optical center and optical elements are configured so that along any section passing through the optical center of the lens the mean sphere and/or the mean cylinder of the optical elements increases from the optical center towards the peripheral part of the lens; and/or the refraction area comprises a far vision reference point, a near vision reference, and a meridian joining the far and near vision reference points, the optical elements are configured so that in standard wearing conditions along any horizontal section of the lens the mean sphere and/or the mean cylinder of the optical elements increases from the intersection of said horizontal section with the meridian towards the peripheral part of the lens; and/or the mean sphere and/or the mean cylinder increase function along the sections are different depending on the position of said section along the meridian; and/or the mean sphere and/or the mean cylinder increase function along the sections are unsymmetrical; and/or the optical elements are configured so that in standard wearing condition the at least one section is a horizontal section; and/or the mean sphere and/or the mean cylinder of optical elements increases from a first point of said section towards the peripheral part of said section and decreases from a second point of said section towards the peripheral part of said section, the second point being closer to the peripheral part of said section than the first point; and/or the mean sphere and/or the mean cylinder increase function along the at least one horizontal section is a Gaussian function; and/or the mean sphere and/or the mean cylinder increase function along the at least one horizontal section is a Quadratic function; and/or at least one, for example at least 70%, for example all optical elements are active optical element that may be activated by an optical lens controller device; and/or the active optical element comprises a material having a variable refractive index whose value is controlled by the optical lens controller device; and/or at least one optical element has a contour shape inscribable in a circle having a diameter greater than or equal to 0.8 mm and smaller than or equal to 3.0 mm; and/or the optical elements are positioned on a network; and/or the network is a structured network; and/or the structured network is a squared network or a hexagonal network or a triangle network or an octagonal network; and/or the lens element further comprises at least four optical elements organized in at least two groups of optical elements; and/or each group of optical element is organized in at least two concentric rings having the same center, the concentric ring of each group of optical element being defined by an inner diameter corresponding to the smallest circle that is tangent to at least one optical element of said group and an outer diameter corresponding to the largest circle that is tangent to at least one optical elements of said group; and/or at least part of, for example all the concentric rings of optical elements are centered on the optical center of the surface of the lens element on which said optical elements are disposed; and/or the concentric rings of optical elements have a diameter comprised between 9.0 mm and 60 mm; and/or the distance between two successive concentric rings of optical elements is greater than or equal to 5.0 mm, the distance between two successive concentric rings being defined by the difference between the inner diameter of a first concentric ring and the outer diameter of a second concentric ring, the second concentric ring being closer to the periphery of the lens element.

BRIEF DESCRIPTION OF THE DRAWINGS

Non-limiting embodiments of the invention will now be described with reference to the accompanying drawing wherein.

Elements in the figures are illustrated for simplicity and clarity and have not necessarily been drawn to scale. For example, the dimensions of some of the elements in the figure may be exaggerated relative to other elements to help to improve the understanding of the embodiments of the present invention.

DETAILED DESCRIPTION OF EMBODIMENTS OF THE INVENTION

The invention relates to a lens element intended to be worn in front of an eye of a person.

In the reminder of the description, terms like «up», «bottom», «horizontal», «vertical», «above», «below», «front», «rear» or other words indicating relative position may be used. These terms are to be understood in the wearing conditions of the lens element.

In the context of the present invention, the term "lens element" can refer to an uncut optical lens or a spectacle optical lens edged to fit a specific spectacle frame or an ophthalmic lens and an optical device adapted to be positioned on the ophthalmic lens. The optical device may be positioned on the front or back surface of the ophthalmic lens. The optical device may be an optical patch. The optical device may be adapted to be removably positioned on the ophthalmic lens for example a clip configured to be clipped on a spectacle frame comprising the ophthalmic lens.

A lens element 10 according to the invention is adapted for a person and intended to be worn in front of an eye of said person.

Figure 1:
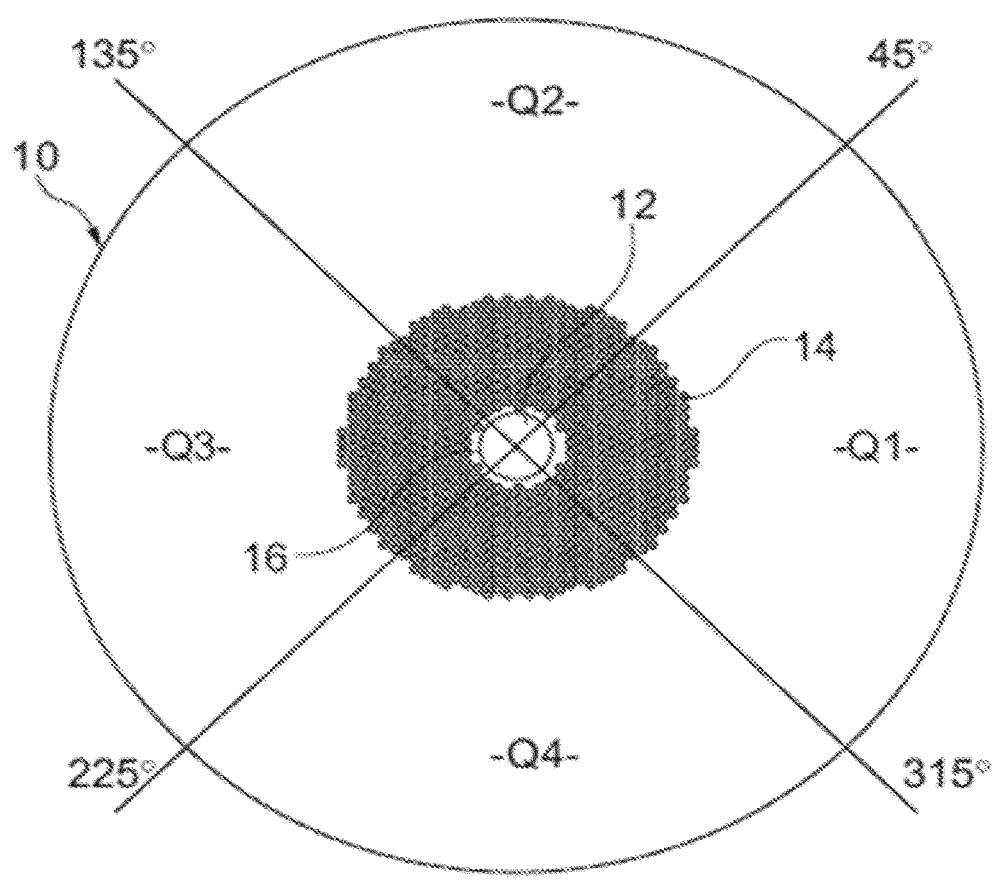
FIG. 1 is a plan view of a lens element according to the invention.

As represented on FIG. 1, a lens element 10 according to the invention comprises:

a refraction area 12, and a plurality of at least three optical elements 14.

The refraction area 12 has a first refractive power P1 based on the prescription of the eye of the person for which the lens element is adapted. The prescription is adapted for correcting the abnormal refraction of the eye of the person.

The term "prescription" is to be understood to mean a set of optical characteristics of optical power, of astigmatism, of prismatic deviation, determined by an ophthalmologist or optometrist in order to correct the vision defects of the eye, for example by means of a lens positioned in front of his eye. For example, the prescription for a myopic eye comprises the values of optical power and of astigmatism with an axis for the distance vision.

The refractive area 12 further comprises at least a second refractive power P2 different from the first refractive power P1.

In the sense of the invention, the two refractive powers are considered different when the difference between the two refractive powers is greater than or equal to 0.5 D.

When the abnormal refraction of the eye of the person corresponds to myopia the second refractive power is greater than the first refractive power.

When the abnormal refraction of the eye of the person corresponds to hyperopia, the second refractive power is smaller than the first refractive power.

The refractive area is preferably formed as the area other than the areas formed as the plurality of optical elements. In other words, the refractive area is the complementary area to the areas formed by the plurality of optical elements.

The refractive area may have a continuous variation of refractive power. For example, the refractive area may have a progressive addition design.

The optical design of the refraction area may comprise
- a fitting cross where the optical power is negative,
- a first zone extending in the temporal side of the refractive are when the lens element is being worn by a wearer. In the first zone, the optical power increases when moving towards the temporal side, and over the nasal side of the lens, the optical power of the ophthalmic lens is substantially the same as at the fitting cross.

Such optical design is disclosed in greater details in WO2016/107919.

Alternatively, the refractive power in the refractive area may comprise at least one discontinuity.

As represented on FIG. 1, the lens element may be divided in five complementary zones, a central zone 16 having a power being equal to the first refractive power and four quadrants Q1, Q2, Q3, Q4 at 45°, at least one of the quadrant having at least a point where the refractive power is equal to the second refractive power.

In the sense of the invention the "quadrants at 45°" are to be understood as equal angular quadrant of 90° oriented in the directions 45°/225° and 135°/315° according to the TABO convention as illustrated on FIG. 1.

Preferably, the central zone 16 comprises a framing reference point that faces the pupil of the person gazing straight ahead in standard wearing conditions and has a diameter greater than or equal to 4 mm and smaller than or equal to 22 mm.

The wearing conditions are to be understood as the position of the lens element with relation to the eye of a wearer, for example defined by a pantoscopic angle, a Cornea to lens distance, a Pupil-cornea distance, a centre of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to −8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearer condition may be defined by a pantoscopic angle of −8°, a Cornea to lens distance of 12 mm, a Pupil-cornea distance of 2 mm, a CRE to pupil distance of 11.5 mm, a CRE to lens distance of 25.5 mm and a wrap angle of 0°.

According to an embodiment of the invention at least the lower part quadrant Q4 has a second refractive power different from the first refractive power corresponding to the prescription for correcting the abnormal refraction.

For example, the refractive area has a progressive addition dioptric function. The progressive addition dioptric function may extend between the upper part quadrant Q2 and the lower part quadrant Q4.

Advantageously, such configuration allows compensation of accommodative lag when the person looks for example at near vision distances thanks to the addition of the lens.

According to an embodiment, at least one of the temporal Q3 and nasal Q1 quadrant has the second refractive power. For example, the temporal Q3 quadrant has a variation of power with the eccentricity of the lens.

Advantageously, such configuration increases the efficiency of the abnormal refraction control in peripheral vision with even more effect in horizontal axis.

According to an embodiment, the four quadrants Q1, Q2, Q3 and Q4 have a concentric power progression.

At least one optical element of the plurality of at least three optical elements 14, has an optical function of not focusing an image on the retina of the eye of the person when the lens element is worn in standard wearing conditions.

Advantageously, such optical function of the optical element combined with a refractive area having at least one refractive power different from the refractive power of the prescription allows slowing down the progression of the abnormal refraction of the eye of the person wearing the lens element.

The optical elements may be as represented on FIG. 1, non-contiguous optical elements.

In the sense of the invention two optical elements are non-contiguous if for all the paths linking the two optical elements one may measure at least along part of each path the refractive power based on a prescription for the eye of the person.

When the two optical elements are on a spherical surface, the two optical elements are non-contiguous if there for all the paths linking the two optical elements one may measure at least along part of each path the curvature of said spherical surface.

Figure 2:
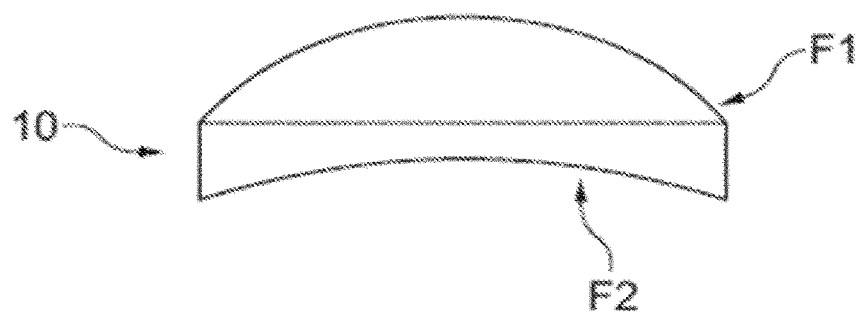
FIG. 2 is a general profile view of a lens element according to the invention.

As illustrated on FIG. 2, a lens element 10 according to the invention comprises an object side surface F1 formed as a convex curved surface toward an object side, and an eye side surface F2 formed as a concave surface having a different curvature than the curvature of the object side surface F1.

According to an embodiment of the invention, at least part, for example all, of the optical elements are located on the front surface of the lens element.

At least part, for example all, of the optical elements may be located on the back surface of the lens element.

At least part, for example all, of the optical elements may be located between the front and back surfaces of the lens element. For example, the lens element may comprise zones of different refractive index forming the optical elements.

According to an embodiment of the invention, the central zone of the lens corresponding to a zone centered on the optical center of the lens element does not comprise optical elements. For example, the lens element may comprise an empty zone centered on the optical center of said lens element and having a diameter equal to 0.9 mm which does not comprise optical elements.

The optical center of the lens element may correspond to the fitting point of the lens.

Alternatively, the optical elements may be disposed on the entire surface of the lens element.

According to embodiments of the invention, the optical elements are positioned on a network.

The network on which the optical elements are positioned may be a structured network.

Figure 8:
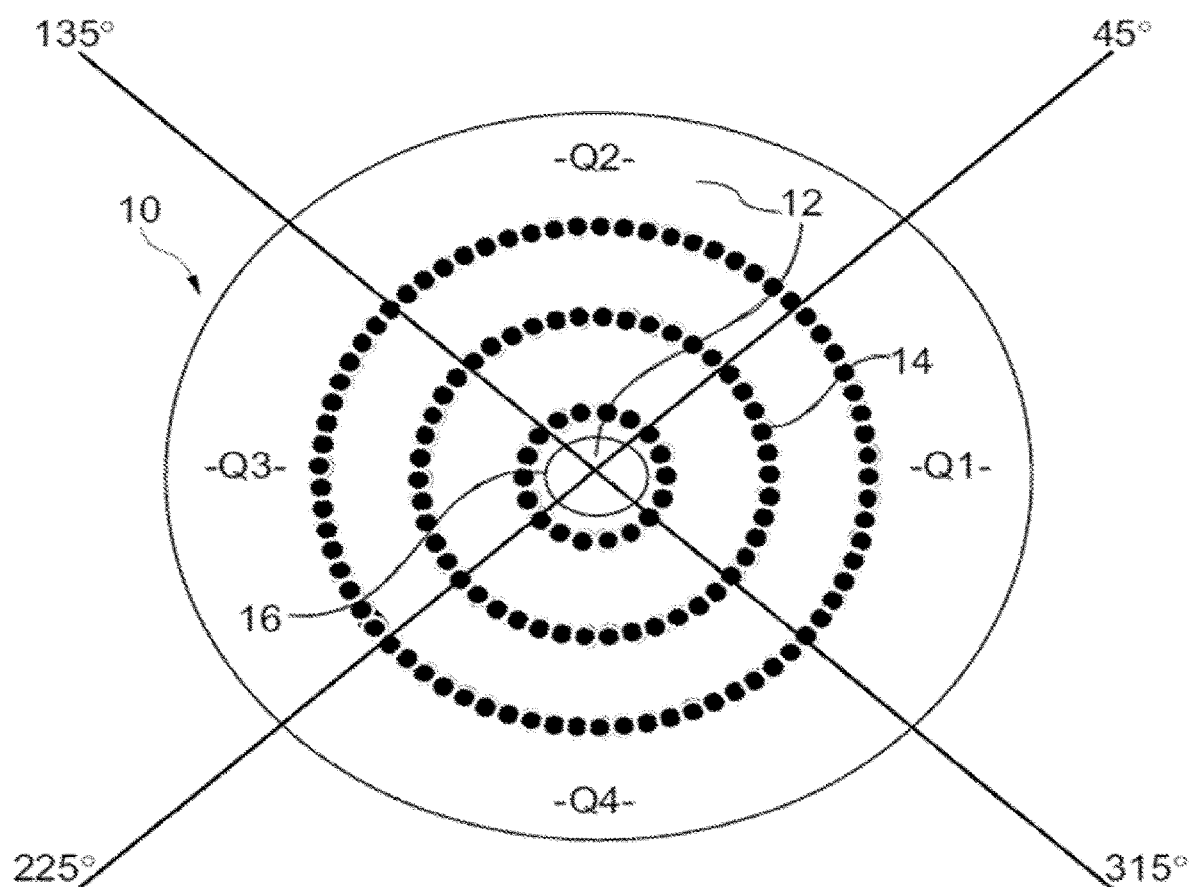
FIG. 8 is a plan view of a lens element according to an embodiment of the invention.

In the embodiments illustrated on FIG. 8 the optical elements are positioned along a plurality of concentric rings.

The concentric rings of optical elements may be annular rings.

According to an embodiment of the invention, the lens element further comprises at least four optical elements. The at least four optical elements are organized in at least two groups of optical elements, each group of optical element being organized in at least two concentric rings having the same center, the concentric ring of each group of optical element being defined by an inner diameter and an outer diameter.

The inner diameter of a concentric ring of each group of optical elements corresponds to the smallest circle that is tangent to at least one optical element of said group of optical elements. The outer diameter of a concentric ring of optical element corresponds to the largest circle that is tangent to at least one optical element of said group.

For example, the lens element may comprise n rings of optical elements, $f_{inner\ 1}$ referring to the inner diameter of the concentric ring which is the closest to the optical center of the lens element, $f_{outer\ 1}$ referring to the outer diameter of the concentric ring which is the closest to the optical center of the lens element, $f_{inner\ n}$ referring to the inner diameter of the ring which is the closest to the periphery of the lens element, and $f_{outer\ n}$ referring to the outer diameter of the concentric ring which is the closest to the periphery of the lens element.

The distance D between two successive concentric rings of optical elements i and i+1 may be expressed as:

$$D_i = |f_{inner\ i+1} - f_{outer\ i}|,$$

wherein $f_{outer\ i}$ refers to the outer diameter of a first ring of optical elements i and $f_{inner\ i+1}$ refers to the inner diameter of a second ring of optical elements i+1 that is successive to the first one and closer to the periphery of the lens element.

According to another embodiment of the invention, the optical elements are organized in concentric rings centered on the optical center of the surface of the lens element on which the optical elements are disposed and linking the geometrical center of each optical element.

For example, the lens element may comprise n rings of optical elements, $f_1$ referring to the diameter of the ring which is the closest to the optical center of the lens element and $f_n$ referring to the diameter of the ring which is the closest to the periphery of the lens element.

The distance D between two successive concentric rings of optical elements i and i+1 may be expressed as:

$$D_i = \left| f_{i+1} - f_i - \frac{d_{i+1}}{2} - \frac{d_i}{2} \right|,$$

wherein $f_i$ refers to the diameter of a first ring of optical elements i and $f_{i+i}$ refers to the diameter of a second ring of optical elements i+1 that is successive to the first one and closer to the periphery of the lens element, and wherein $d_i$ refers to the diameter of the optical elements on the first ring of optical elements and $d_{i+1}$ refers to the diameter of the optical elements on the second ring of optical elements that is successive to the first ring and closer to the periphery of the lens element. The diameter of the optical element corresponds to the diameter of the circle in which the contour shape of the optical element is inscribed.

The concentric rings of optical elements may be annular rings.

Advantageously, the optical center of the lens element and the center of the concentric rings of optical elements coincide. For example, the geometrical center of the lens element, the optical center of the lens element, and the center of the concentric rings of optical elements coincide.

In the sense of the invention, the term coincide should be understood as being really close together, for example distanced by less than 1.0 mm.

The distance $D_i$ between two successive concentric rings may vary according to i. For example, the distance D, between two successive concentric rings may vary between 2.0 mm and 5.0 mm.

According to an embodiment of the invention, the distance $D_i$ between two successive concentric rings of optical elements is greater than 2.00 mm, preferably 3.0 mm, more preferably 5.0 mm.

Advantageously, having the distance D between two successive concentric rings of optical elements greater than 2.00 mm allows managing a larger refraction area between these rings of optical elements and thus provides better visual acuity.

Considering an annular zone of the lens element having an inner diameter greater than 9 mm and an outer diameter smaller than 57 mm, having a geometrical center located at a distance of the optical center of the lens element smaller than 1 mm, the ratio between the stun of areas of the parts of optical elements located inside said circular zone and the area of said circular zone is comprised between 20% and 70%, preferably between 30% and 60%, and more preferably between 40% and 50%.

In other words, the inventors have observed that for a given value of the abovementioned ratio, the organization of optical elements in concentric rings, where these rings are spaced by a distance greater than 2.0 mm, allows providing annular zones of refractive area easier to manufacture than the refractive area managed when optical element are disposed in hexagonal network or randomly disposed on the surface of the lens element, thereby provide a better correction of the abnormal refraction of the eye and thus a better visual acuity.

According to an embodiment of the invention, the diameter di of all optical elements of the lens element are identical.

According to an embodiment of the invention, the distance $D_i$ between two successive concentric rings i and i+1 may increase when i increases towards the periphery of the lens element.

The concentric rings of optical elements may have a diameter comprised between 9 mm and 60 mm.

According to an embodiment of the invention, the lens element comprises optical elements disposed in at least 2 concentric rings, preferably more than 5, more preferably more than 10 concentric rings. For example, the optical elements may be disposed in 11 concentric rings centered on the optical center of the lens.

According to an embodiment of the invention, at least one of the optical elements has an optical function of focusing an image on a position other than the retina.

Preferably, at least 50%, for example at least 80%, for example all, of the optical elements have an optical function of focusing an image on a position other than the retina.

According to an embodiment of the invention, the optical elements are configured so that at least along one section of the lens the mean sphere of the optical elements increases from a point of said section towards the periphery of said section.

The optical elements may further be configured so that at least along one section of the lens, for example at least the same section as the one along which the mean sphere of the optical elements increases, the mean cylinder increases from a point of said section, for example the same point as for the mean sphere, towards the peripheral part of said section.

Advantageously, having optical elements configured so that along at least one section of the lens the mean sphere and/or mean cylinder of optical elements increases from a point of said section towards the peripheral part of said section allows increasing the defocus of the light rays in front the retina in case of myopia or behind the retina in case of hyperopia.

In other words, the inventors have observed that having optical elements configured so that along at least one section of the lens the mean sphere of optical elements increases from a point of said section towards the peripheral part of said section helps slow down the progression of abnormal refraction of the eye such as myopia or hyperopia.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in dioptres.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in dioptres.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface (also referred to as the front surface), the expressions are the following:

$$SPH_{min} = (n-1)*CURV_{min} = \frac{n-1}{R_{max}}, \text{ and}$$

$$SPH_{min} = (n-1)*CURV_{min} = \frac{n-1}{R_{max}}$$

where n is the refractive index of the constituent material of the lens.

If the surface considered is an eyeball side surface (also referred to as the back surface), the expressions are the following:

$$SPH_{min} = (1-n)*CURV_{min} = \frac{1-n}{R_{max}} \text{ and}$$

$$SPH_{max} = (1-n)*CURV_{max} = \frac{1-n}{R_{min}}$$

where n is the refractive index of the constituent material of the lens.

As is well known, a mean sphere $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:
if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

a cylinder CYL is also defined by the formula $CYL=|SPH_{max}-SPH_{min}|$.

The characteristics of any aspherical face of the lens may be expressed by the local mean spheres and cylinders. A surface can be considered as locally aspherical when the cylinder is at least 0.25 diopters.

Figure 7A:
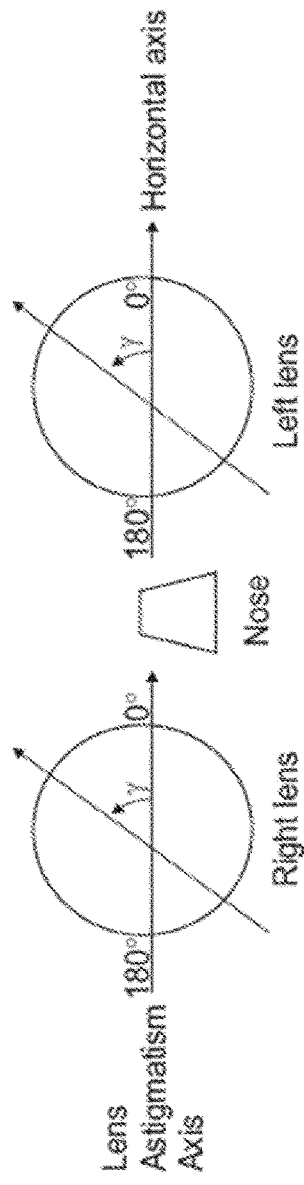
FIG. 7a illustrates the astigmatism axis γ of a lens in the TABO convention.
Figure 7B:
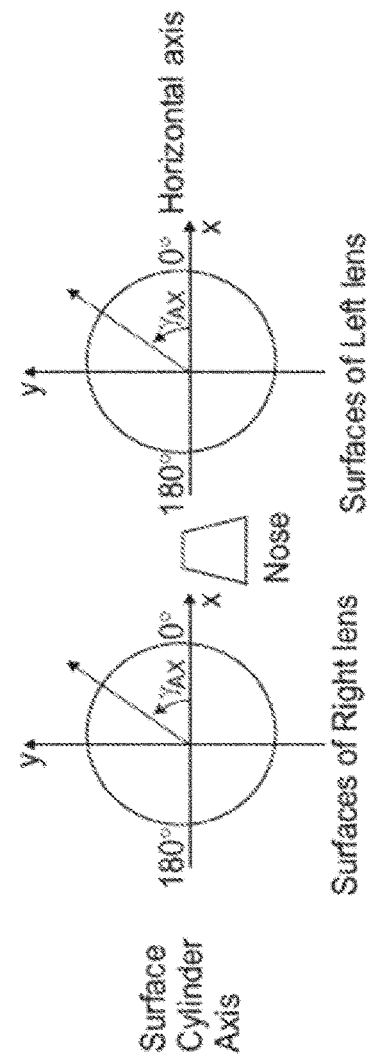
FIG. 7b illustrates the cylinder axis $\gamma_{Ax}$ in a convention used to characterize an aspherical surface.

For an aspherical surface, a local cylinder axis $\gamma_{AX}$ may further be defined. FIG. 7a illustrates the astigmatism axis γ as defined in the TABO convention and FIG. 7b illustrates the cylinder axis $\gamma_{AX}$ in a convention defined to characterize an aspherical surface.

The cylinder axis $\gamma_{AX}$ is the angle of the orientation of the maximum curvature $CURV_{max}$ with relation to a reference axis and in the chosen sense of rotation. In the above defined convention, the reference axis is horizontal (the angle of this reference axis is 0°) and the sense of rotation is counter-clockwise for each eye, when looking at the wearer ($0°\leq\gamma_{AX}\leq180°$). An axis value for the cylinder axis $\gamma_{AX}$ of +45° therefore represents an axis oriented obliquely, which when looking at the wearer, extends from the quadrant located up on the right to the quadrant located down on the left.

The optical elements may be configured so that that along the at least one section of the lens the mean sphere and/or the mean cylinder of optical elements increases from the center of said section towards the peripheral part of said section.

According to an embodiment of the invention, the optical elements are configured so that in standard wearing condition the at least one section is a horizontal section.

The mean sphere and/or the mean cylinder may increase according to an increase function along the at least one horizontal section, the increase function being a Gaussian function. The Gaussian function may be different between the nasal and temporal part of the lens so as to take into account the dissymmetry of the retina of the person.

Alternatively, the mean sphere and/or the mean cylinder may increase according to an increase function along the at least one horizontal section, the increase function being a Quadratic function. The Quadratic function may be different between the nasal and temporal part of the lens so as to take into account the dissymmetry of the retina of the person.

According to an embodiment of the invention, the mean sphere and/or the mean cylinder of optical elements increases from a first point of said section towards the peripheral part of said section and decreases from a second point of said section towards the peripheral part of said section, the second point being closer to the peripheral part of said section than the first point.

Such embodiment is illustrated in table 1 that provides the mean sphere of optical elements according to their radial distance to the optical center of the lens element.

In the example of table 1, the optical elements are micro lens placed on a spherical front surface having a curvature of 329.5 mm and the lens element is made of an optical material having a refractive index of 1.591, the prescribed optical power of the wearer is of 6 D. The optical element is to be worn in standard wearing conditions and the retina of the wearer is considered as having a defocus of 0.8 D at an angle of 30°.

TABLE 1

| Distance to optical center (mm) | Mean sphere of optical element (D) |
| --- | --- |
| 0 | 1.992 |
| 5 | 2.467 |
| 7.5 | 2.806 |
| 10 | 3.024 |
| 15 | 2.998 |
| 20 | 2.485 |

As illustrated in table 1, starting close to the optical center of the lens element, the mean sphere of the optical elements increases towards the peripheral part of said section and then decreases towards the peripheral part of said section.

According to an embodiment of the invention, the mean cylinder of optical elements increases from a first point of said section towards the peripheral part of said section and decreases from a second point of said section towards the peripheral part of said section, the second point being closer to the peripheral part of said section than the first point.

Such embodiment is illustrated in tables 2 and 3 that provides the amplitude of the cylinder vector projected on a first direction Y corresponding to the local radial direction and a second direction X orthogonal to the first direction.

In the example of table 2, the optical elements are micro-lenses placed on a spherical front surface having a curvature of 167.81 mm and the lens element is made of a material having a refractive index of 1.591, the prescribed optical power of the wearer is of −6 D. The lens element is to be worn in standard wearing conditions and the retina of the wearer is considered as having a defocus of 0.8 D at an angle of 30°. The elements are determined to provide a peripheral defocus of 2 D.

In the example of table 3, the optical elements are micro-lenses placed on a spherical front surface having a curvature of 167.81 mm and the lens element is made of a material having a refractive index of 1.591, the prescribed optical power of the wearer is of −1 D. The lens element is to be worn in standard wearing conditions and the retina of the wearer is considered as having a defocus of 0.8 D at an angle of 30°. The optical elements are determined to provide a peripheral defocus of 2 D.

TABLE 2

| gazing direction (in degree) | Px (in Diopter) | Py (in Diopter) | Cylinder (in Diopter) |
| --- | --- | --- | --- |
| 0 | 1.987 | 1.987 | 1.987 |
| 18.581 | 2.317 | 2.431 | 2.374 |
| 27.002 | 2.577 | 2.729 | 2.653 |
| 34.594 | 2.769 | 2.881 | 2.825 |
| 47.246 | 2.816 | 2.659 | 2.7375 |
| 57.02 | 2.446 | 1.948 | 2.197 |

TABLE 3

| gazing direction (in degree) | Px (in Diopter) | Py (in Diopter) | Cylinder (in Diopter) |
| --- | --- | --- | --- |
| 0 | 1.984 | 1.984 | 1.984 |
| 18.627 | 2.283 | 2.163 | 2.223 |
| 27.017 | 2.524 | 2.237 | 2.3805 |
| 34.526 | 2.717 | 2.213 | 2.465 |
| 46.864 | 2.886 | 1.943 | 2.4145 |
| 56.18 | 2.848 | 1.592 | 2.22 |

As illustrated in tables 2 and 3, starting close to the optical center of the lens element, the cylinder of the optical elements increases towards the peripheral part of said section and then decreases towards the peripheral part of said section.

According to an embodiment of the invention, the refraction area comprises an optical center and optical elements are configured so that along any section passing through the optical center of the lens the mean sphere and/or the mean cylinder of the optical elements increases from the optical center towards the peripheral part of the lens.

For example, the optical elements may be regularly distributed along circles centered on the optical center of the refraction area.

The optical elements on the circle of diameter 10 mm and centered on the optical center of the refraction area may be micro lenses having a mean sphere of 2.75 D.

The optical elements on the circle of diameter 20 mm and centered on the optical center of the refraction area may be micro lenses having a mean sphere of 4.75 D.

The optical elements on the circle of diameter 30 mm and centered on the optical center of the refraction area may be micro lenses having a mean sphere of 5.5 D.

The optical elements on the circle of diameter 40 mm and centered on the optical center of the refraction area may be micro lenses having a mean sphere of 5.75 D.

The mean cylinder of the different micro lenses may be adjusted based on the shape of the retina of the person.

According to an embodiment of the invention, the refraction area comprises a far vision reference point, a near vision reference, and a meridian joining the far and near vision reference points. For example, the refraction area may comprise a progressive additional lens design adapted to the prescription of the person or adapted to slow down the progression of the abnormal refraction of the eye of the person wearing the lens element.

Preferably, according to such embodiment, the optical elements are configured so that in standard wearing conditions along any horizontal section of the lens the mean sphere and/or the mean cylinder of the optical elements increases from the intersection of said horizontal section with the meridian line towards the peripheral part of the lens.

The meridian line corresponds to the locus of the intersection of the main gaze direction with the surface of the lens.

The mean sphere and/or the mean cylinder increase function along the sections may be different depending on the position of said section along the meridian line.

In particular, the mean sphere and/or the mean cylinder increase function along the sections are unsymmetrical. For example, the mean sphere and/or the mean cylinder increase function are unsymmetrical along vertical and/or horizontal section in standard wearing conditions.

According to an embodiment of the invention, at least one of the optical elements has a non-spherical optical function.

Preferably at least 50%, for example at least 80%, for example all, of the optical elements 14 have a non-spherical optical function.

In the sense of the invention, a "non-spherical optical function" is to be understood as not having a single focus point.

Advantageously, such optical function of the optical element reduces the deformation of the retina of the eye of the wearer, allowing to slow down the progression of the abnormal refraction of the eye of the person wearing the lens element.

The at least one element having a non-spherical optical function is transparent.

Advantageously, the non-contiguous optical elements are not visible on the lens element and do not affect the aesthetic of the lens element.

According to an embodiment of the invention, the lens element may comprise an ophthalmic lens bearing the refraction area and a clip-on bearing the plurality of at least three optical elements adapted to be removably attached to the ophthalmic lens when the lens element is worn. Advantageously, when the person is in a far distance environment, outside for example, the person may separate the clip-on from the ophthalmic lens and eventually substitute a second clip-on free of any of at least three optical elements. For example, the second clip-on may comprise a solar tint. The person may also use the ophthalmic lens without any additional clip-on.

The optical element may be added to the lens element independently on each surface of the lens element.

One can add these optical elements on a defined array like square or hexagonal or random or other.

The optical element may cover specific zones of the lens element, like at the center or any other area.

The optical element density or the quantity of power may be adjusted depending on zones of the lens element. Typically, the optical element may be positioned in the periphery of the lens element, in order to increase the effect of the optical element on myopia control, so as to compensate peripheral defocus due to the peripheral shape of the retina for example.

According to a preferred embodiment of the invention, every circular zone having a radius comprised between 2 and 4 mm comprising a geometrical center located at a distance of the optical center of the lens element greater or equal to said radius+5 mm, the ratio between the sum of areas of the parts of optical elements located inside said circular zone and the area of said circular zone is comprised between 20% and 70%, preferably between 30% and 60%, and more preferably between 40% and 50%.

The optical elements can be made using different technologies like direct surfacing, molding, casting or injection, embossing, filming, or photolithography etc.

According to an embodiment of the invention, at least one, for example all, of the optical elements has a shape configured so as to create a caustic in front of the retina of the eye of the person. In other words, such optical element is configured so that every section plane where the light flux is concentrated if any, is located in front of the retina of the eye of the person.

According to an embodiment of the invention, the at least one, for example all, of the optical element having a non-spherical optical function is a multifocal refractive micro-lens.

In the sense of the invention, a "micro-lens" has a contour shape being inscribable in a circle having a diameter greater than or equal to 0.8 mm and smaller than or equal to 3.0 mm, preferably greater than or equal to 1.0 mm and smaller than 2.0 mm.

In the sense of the invention, an optical element is "multifocal refractive micro-lens" includes bifocals (with two focal powers), trifocals (with three focal powers), progressive addition lenses, with continuously varying focal power, for example aspherical progressive surface lenses.

According to an embodiment of the invention, at least one of the optical element, preferably more than 50%, more preferably more than 80% of the optical elements are aspherical microlenses. In the sense of the invention, aspherical microlenses have a continuous power evolution over their surface.

An aspherical microlens may have an asphericity comprised between 0.1 D and 3D. The asphericity of an aspherical microlens corresponds to the ratio of optical power measured in the center of the microlens and the optical power measured in the periphery of the microlens.

The center of the microlens may be defined by a spherical area centered on the geometrical center of the microlens and having a diameter comprised between 0.1 mm and 0.5 mm, preferably equal to 2.0 mm.

The periphery of the microlens may be defined by an annular zone centered on the geometrical center of the microlens and having an inner diameter comprised between 0.5 mm and 0.7 mm and an outer diameter comprised between 0.70 mm and 0.80 mm.

According to an embodiment of the invention, the aspherical microlenses have an optical power in their geometrical center comprised between 2.0 D and 7.0 D in absolute value, and an optical power in their periphery comprised between 1.5 D and 6.0 D in absolute value.

The asphericity of the aspherical microlenses before the coating of the surface of the lens element on which the optical elements are disposed may vary according to the radial distance from the optical center of said lens element.

Additionally, the asphericity of the aspherical microlenses after the coating of the surface of the lens element on which the optical elements are disposed may further vary according to the radial distance from the optical center of said lens element.

According to an embodiment of the invention, the at least one multifocal refractive micro-lens has a toric surface. A toric surface is a surface of revolution that can be created by rotating a circle or arc about an axis of revolution (eventually positioned at infinity) that does not pass through its center of curvature.

Toric surface lenses have two different radial profiles at right angles to each other, therefore producing two different focal powers.

Toric and spheric surface components of toric lenses produce an astigmatic light beam, as opposed to a single point focus.

According to an embodiment of the invention, the at least one of the optical element having a non-spherical optical function, for example all, of the optical elements is a toric refractive micro-lens. For example, a toric refractive micro-lens with a sphere power value greater than or equal to 0 diopter ($\delta$) and smaller than or equal to +5 diopters ($\delta$), and cylinder power value greater than or equal to 0.25 Diopter ($\delta$).

As a specific embodiment, the toric refractive microlens may be a pure cylinder, meaning that minimum meridian power is zero, while maximum meridian power is strictly positive, for instance less than 5 Diopters.

According to an embodiment of the invention, at least one, for example all, of the optical element, is made of a birefringent material. In other words, the optical element is made of a material having a refractive index that depends on the polarization and propagation direction of light. The birefringence may be quantified as the maximum difference between refractive indices exhibited by the material.

According to an embodiment of the invention, at least one, for example all of the optical element, has discontinuities, such as a discontinuous surface, for example Fresnel surfaces and/or having a refractive index profile with discontinuities.

Figure 3:
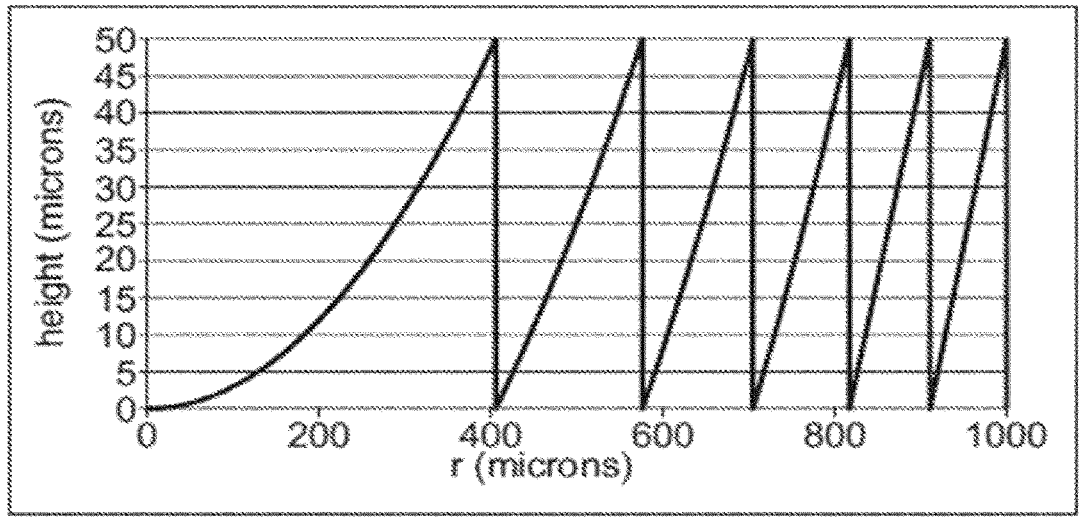
FIG. 3 represents an example of a Fresnel height profile.

FIG. 3 represents an example of a Fresnel height profile of an optical element that may be used for the invention.

According to an embodiment of the invention, at least one, for example all of the optical element, is made of a diffractive lens.

Figure 4:
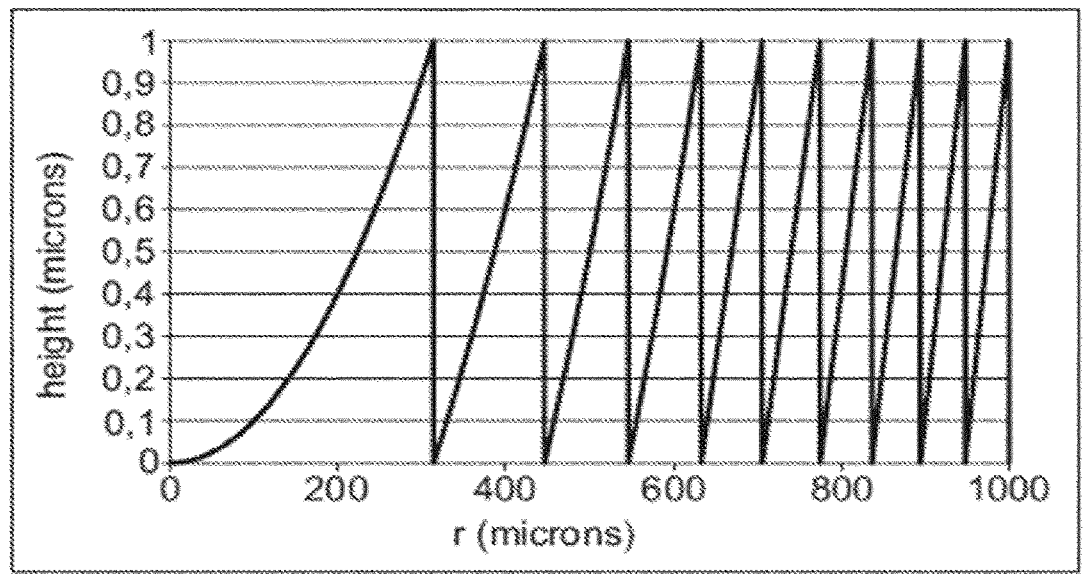
FIG. 4 represents an example of a diffractive lens radial profile.

FIG. 4 represents an example of a diffractive lens radial profile of an optical element that may be used for the invention.

At least one, for example all, of the diffractive lenses may comprise a metasurface structure as disclosed in WO2017/176921.

Figure 5:
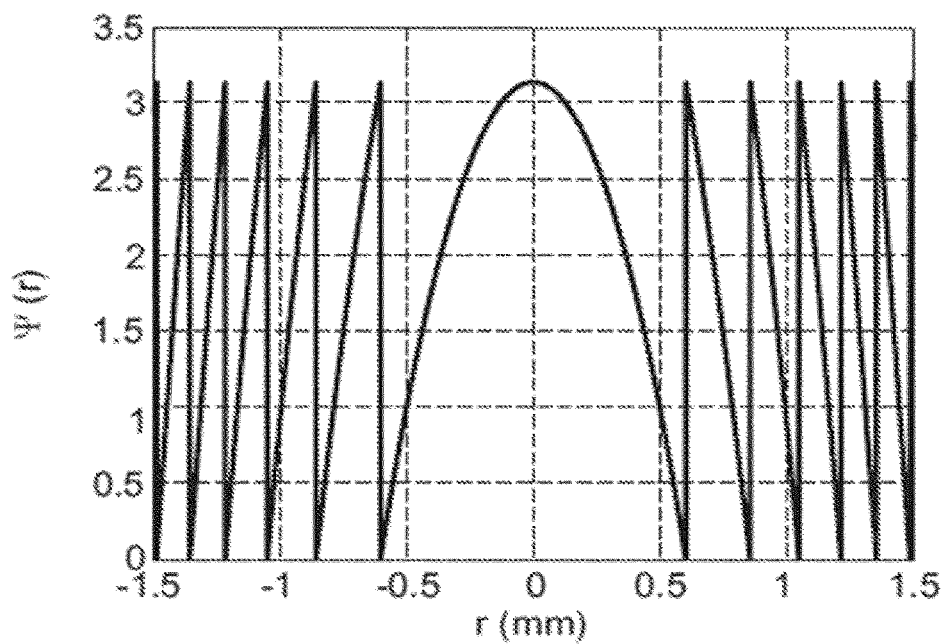
FIG. 5 illustrates a π-Fresnel lens profile.

The diffractive lens may be a Fresnel lens whose phase function $\psi(r)$ has $\pi$ phase jumps at the nominal wavelength, as seen in FIG. 5. One may give these structures the name "$\pi$-Fresnel lenses" for clarity's sake, as opposition to unifocal Fresnel lenses whose phase jumps are multiple values of $2\pi$. The $\pi$-Fresnel lens whose phase function is displayed in FIG. 5 diffracts light mainly in two diffraction orders associated to dioptric powers 0 $\delta$ and a positive one P, for example 3 $\delta$.

According to an embodiment of the invention, at least one, for example all of the optical element, is a multifocal binary component.

Figure 6A:
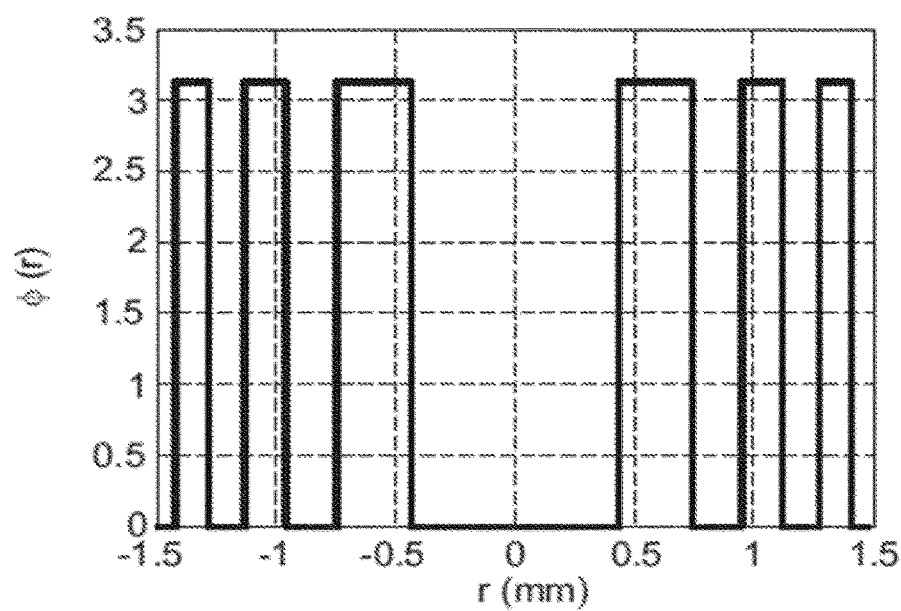
FIGS. 6a to 6c illustrate a binary lens embodiment of the invention.
Figure 6B:
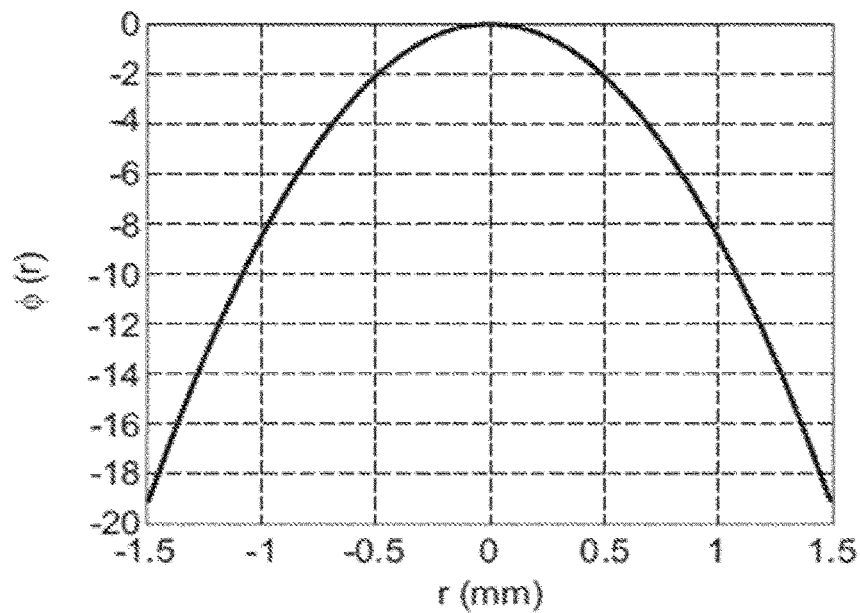
Figure 6C:
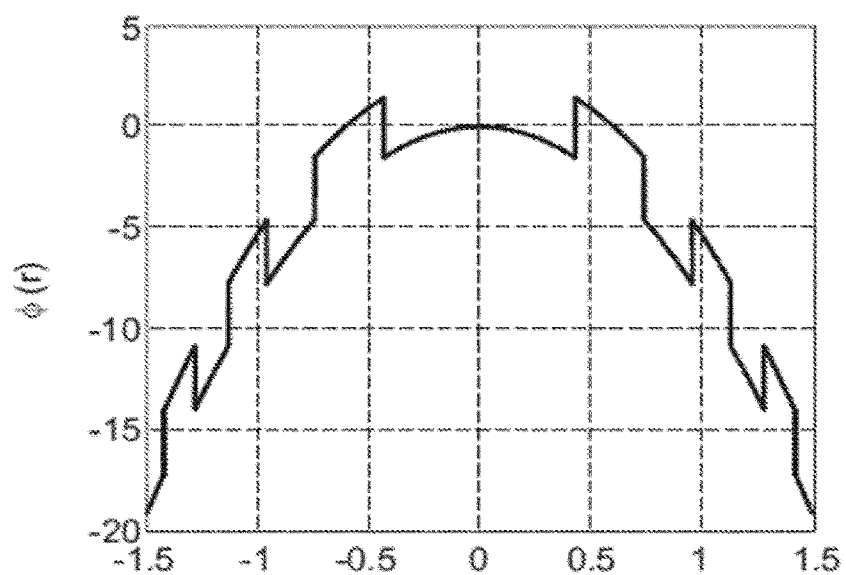

For example, a binary structure, as represented in FIG. 6a, displays mainly two dioptric powers, denoted $-P/2$ and $P/2$. When associated to a refractive structure as shown in FIG. 6b, whose dioptric power is P/2, the final structure represented in FIG. 6c has dioptric powers 0 δ and P. The illustrated case is associated to P=3 δ.

According to an embodiment of the invention, at least one, for example all of the optical element, is a pixelated lens. An example of multifocal pixelated lens is disclosed in Eyal Ben-Eliezer et al, APPLIED OPTICS, Vol. 44, No. 14, 10 May 2005.

According to an embodiment of the invention, at least one, for example all of the optical element, has an optical function with high order optical aberrations. For example, the optical element is a micro-lens composed of continuous surfaces defined by Zernike polynomials.

The invention has been described above with the aid of embodiments without limitation of the general inventive concept.

Many further modifications and variations will be apparent to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A lens element wearable in front of an eye of a person and mountable in an eyeglasses frame, the lens element comprising:
    a refraction area having a refractive power based on a prescription corresponding to the eye of the person; and
    at least three non-contiguous optical elements, at least one optical element of the at least three non-contiguous optical elements having a non-spherical optical function.

2. The lens element according to claim 1, wherein at least one of the at least three non-contiguous optical elements is a multifocal refractive micro-lens.

3. The lens element according to claim 2, wherein the at least one multifocal refractive micro-lens includes an aspherical progressive surface.

4. The lens element according to claim 2, wherein the at least one multifocal refractive micro-lens includes a toric surface.

5. The lens element according to claim 1, wherein at least one of the at least three non-contiguous optical elements is a toric refractive micro-lens.

6. The lens element according to claim 1, wherein at least one of the at least three non-contiguous optical elements is made of a birefringent material.

7. The lens element according to claim 1, wherein at least one of the at least three non-contiguous optical elements is a diffractive lens.

8. The lens element according to claim 7, wherein the at least one diffractive lens includes a metasurface structure.

9. The lens element according to claim 7, wherein at least one of the at least three non-contiguous optical elements is a multifocal binary component.

10. The lens element according to claim 1, wherein at least part of the at least three non-contiguous optical elements are located on a front surface of the lens element.

11. The lens element according to claim 1, wherein at least part of the at least three non-contiguous optical elements are located on a back surface of the lens element.

12. The lens element according to claim 1, wherein at least part of the at least three non-contiguous optical elements are located between a front surface and a back surface of the lens element.

13. The lens element according to claim 1, further comprising an ophthalmic lens bearing the refraction area and a clip-on bearing the at least three non-contiguous optical elements, the clip-on being adapted to be removably attachable to the ophthalmic lens when the lens element is worn.

14. The lens element according to claim 1, wherein for a circular zone having a radius comprised between 2 and 4 mm including a geometrical center located at a distance of an optical center of the lens element greater or equal to said radius+5 mm, a ratio between a sum of areas of parts of optical elements located inside said circular zone and an area of said circular zone is comprised between 20% and 70%.

15. The lens element according to claim 1, wherein at least one optical element of the at least three optical elements has a non-spherical optical function and is configured to suppress a progress of abnormal refraction of the eye of the person.

16. A lens element wearable in front of an eye of a person, the lens element comprising:
    a refraction area having a refractive power based on a prescription corresponding to the eye of the person; and
    at least three non-contiguous optical elements, at least one optical element of the at least three non-contiguous optical elements having a non-spherical optical function,
    wherein at least one of the at least three non-contiguous optical elements is a multifocal binary component.

17. A lens element wearable in front of an eye of a person, the lens element comprising:
    a refraction area having a refractive power based on a prescription corresponding to the eye of the person; and
    at least three non-contiguous optical elements, at least one optical element of the at least three non-contiguous optical elements having a non-spherical optical function,
    wherein at least one of the at least three non-contiguous optical elements is a multifocal refractive micro-lens, and
    wherein the at least one multifocal refractive micro-lens includes an aspherical progressive surface.

* * * * *